United States Patent
Zhu et al.

(10) Patent No.: US 11,384,444 B2
(45) Date of Patent: Jul. 12, 2022

(54) METHOD FOR ELECTROCHEMICAL EXTRACTION OF URANIUM FROM SEAWATER USING OXYGEN VACANCY (OV)-CONTAINING METAL OXIDE

(71) Applicant: SOUTHWEST UNIVERSITY OF SCIENCE AND TECHNOLOGY, Mianyang (CN)

(72) Inventors: Wenkun Zhu, Mianyang (CN); Rong He, Hefei (CN); Yi Li, Bazhong (CN); Tao Duan, Mianyang (CN); Jia Lei, Nanchong (CN); Tao Chen, Wuhu (CN); Fan Yang, Mianyang (CN)

(73) Assignee: SOUTHWEST UNIVERSITY OF SCIENCE AND TECHNOLOGY, Mianyang (CN)

( * ) Notice: Subject to any disclaimer, the term of this patent is extended or adjusted under 35 U.S.C. 154(b) by 0 days.

(21) Appl. No.: 17/433,613

(22) PCT Filed: Dec. 11, 2020

(86) PCT No.: PCT/CN2020/135832
§ 371 (c)(1),
(2) Date: Aug. 25, 2021

(87) PCT Pub. No.: WO2021/121167
PCT Pub. Date: Jun. 24, 2021

(65) Prior Publication Data
US 2022/0090271 A1    Mar. 24, 2022

(30) Foreign Application Priority Data
Dec. 19, 2019  (CN) .......................... 201911317936.6

(51) Int. Cl.
*C25C 7/06* (2006.01)
*C01G 15/00* (2006.01)
(Continued)

(52) U.S. Cl.
CPC ................ *C25C 7/06* (2013.01); *C01G 15/00* (2013.01); *C25C 1/22* (2013.01); *C25C 7/02* (2013.01)

(58) Field of Classification Search
CPC .. C01G 15/00; C25C 1/22; C25C 7/02; C25C 7/06
See application file for complete search history.

(56) References Cited

U.S. PATENT DOCUMENTS

2019/0135638 A1 * 5/2019 Liu ........................... C25C 1/16

FOREIGN PATENT DOCUMENTS

| CN | 109867333 A | 6/2019 |
| CN | 109942076 A | 6/2019 |

(Continued)

OTHER PUBLICATIONS

Chong Liu, et al., A half-wave rectified alternating current electrochemical method for uranium extraction from seawater, Nature Energy, 2017, pp. 1-8, vol. 2 No. 17007.

*Primary Examiner* — Ciel P Contreras
(74) *Attorney, Agent, or Firm* — Bayramoglu Law Offices LLC (57) ABSTRACT

A method for electrochemical extraction of uranium from seawater using an oxygen vacancy (OV)-containing metal oxide includes the following steps: adding glycerin to a solution of indium nitrate in isopropanol, transferring a resulting mixture to a reactor, and conducting reaction to obtain a spherical indium hydroxide solid; dissolving the solid in deionized water, transferring a resulting solution to the reactor, and conducting reaction to obtain a flaky indium hydroxide solid; calcining the solid to obtain calcined OV-containing $In_2O_{3-x}$; adding the $In_2O_{3-x}$ to ethanol, and adding a membrane solution; coating a resulting solution uniformly on carbon paper, and naturally drying the carbon paper; clamping dried carbon paper with a gold electrode for (Continued)

being used as a working electrode for a three-electrode system; and adding simulated seawater to an electrolytic cell, placing the three-electrode system in the simulated seawater, and stirring the simulated seawater for electrolysis to extract uranium from the seawater.

18 Claims, 3 Drawing Sheets

(51) Int. Cl.
*C25C 7/02* (2006.01)
*C25C 1/22* (2006.01)

(56) References Cited

FOREIGN PATENT DOCUMENTS

| CN | 109999779 A | 7/2019 |
|----|-------------|--------|
| CN | 110952107 A | 4/2020 |
| JP | S55124503 A | 9/1980 |

* cited by examiner

METHOD FOR ELECTROCHEMICAL EXTRACTION OF URANIUM FROM SEAWATER USING OXYGEN VACANCY (OV)-CONTAINING METAL OXIDE

CROSS REFERENCE TO THE RELATED APPLICATIONS

This application is the national phase entry of International Application No. PCT/CN2020/135832, filed on Dec. 11, 2020, which is based upon and claims priority to Chinese Patent Application No. 201911317936.6, filed on Dec. 19, 2019, the entire contents of which are incorporated herein by reference.

TECHNICAL FIELD

The present disclosure relates to a method for extracting uranium from seawater, and in particular to a method for electrochemical extraction of uranium from seawater using an oxygen vacancy (OV)-containing metal oxide.

BACKGROUND

Uranium is a raw material for nuclear power. Currently, there are very few uranium reserves in natural ores and limited exploitable uranium ore resources globally. There is a total ocean water volume of about $1.37 \times 10^{12}$ m$^3$ worldwide, and a total uranium reserve of 4.29 billion tons in seawater, which is nearly 1,000 times that on land. The development of nuclear power and low-carbon economy imposes an increasing demand for uranium resources. Given the scarcity of uranium and the limitation of uranium ore resources, it is of great significance to extract uranium from seawater to supplement or replace traditional uranium ore resources.

The current uranium extraction methods mainly include chemical precipitation, ion exchange, membrane separation, adsorption, and the like. The chemical precipitation process requires simple equipment, is low cost, and has high efficiency, however the polymer obtained therefrom needs to be further concentrated, dehydrated, and solidified. The ion exchange process has high extraction efficiency and prominent purification effect, but has the disadvantages of being high cost, poor selectivity, and having a limited exchange capacity. The membrane separation process has the advantages of simple operation, low energy consumption, and strong adaptability, but has high requirements on the quality of raw water and often requires concurrent use with other water treatment technologies. The adsorption process requires the adsorbents to have large treatment capacity, strong adsorption selectivity, high corrosion resistance, and high mechanical strength, while existing adsorbing materials have low adsorption efficiency, high production cost, and difficult recycling in practical applications.

OV-containing compounds can capture oxygen ions, and uranium in seawater exists in the form of uranyl ions, namely, uranium-oxygen complexes, such as $UO_2^{2+}$. Therefore, OVs can achieve the effect of indirect capture of uranium by capturing oxygen, such that OV-containing compounds can easily capture uranyl ions. Moreover, an electrochemical electrolysis method is used to coat an OV-containing compound on carbon paper, and the resulting carbon paper is used as a working electrode. A platinum wire is used as a counter electrode, and a calomel electrode is used as a reference electrode. The electrodes are energized to fix uranium in seawater on the working electrode, thus realizing uranium extraction from seawater.

SUMMARY

One objective of the present disclosure is to solve at least the above-mentioned problems and/or disadvantages and provide at least the advantages to be described later.

In order to achieve the objective and other advantages according to the present disclosure, a method for electrochemical extraction of uranium from seawater using an OV-containing metal oxide is provided, including the following steps:

step 1. preparing a solution of indium nitrate in isopropanol with a concentration of 0.024 mol/L to 0.028 mol/L, adding glycerin to the solution of indium nitrate in isopropanol, and subjecting a resulting mixture to stirring for 0.5 h to 1 h and then to ultrasonic treatment for 0.5 h to 1 h to obtain a mixed solution;

step 2. transferring the mixed solution to a high-temperature and high-pressure polytetrafluoroethylene (PTFE) reactor, heating to 160° C. to 200° C. and holding at the temperature for 1 h to 3 h, and naturally cooling to room temperature; and conducting solid-liquid separation (SLS), washing a resulting solid with deionized water and ethanol, and drying the solid in a vacuum drying oven at 60° C. to 80° C. for 10 h to 14 h to obtain a spherical indium hydroxide solid;

step 3. dissolving the spherical indium hydroxide solid in deionized water, and conducting ultrasonic treatment for 0.5 h to 1 h; transferring a resulting solution to a high-temperature and high-pressure PTFE reactor, heating to 40° C. to 60° C. and holding at the temperature for 1 h to 3 h, and naturally cooling to room temperature; and washing a resulting solid with ethanol, and drying the solid in an oven at 60° C. to 80° C. for 10 h to 14 h to obtain a flaky indium hydroxide solid;

step 4. heating the flaky indium hydroxide solid to 350° C. to 450° C. in an atmosphere with a hydrogen content of less than 5%, and conducting calcination for 1 h to 3 h to obtain a calcined. OV-containing $In_2O_{3-x}$ sample;

step 5. adding the $In_2O_{3-x}$ sample to ethanol, and conducting ultrasonic treatment for 0.5 h to 1 h; adding a membrane solution, and further conducting ultrasonic treatment for 0.5 h to 1 h; coating a resulting solution uniformly on carbon paper, and naturally drying the carbon paper; and clamping dried carbon paper with a gold electrode, and using a resulting product as a working electrode for a three-electrode system, where in the three-electrode system, a platinum wire is used as a counter electrode and a calomel electrode is used as a reference electrode; and step 6. adding simulated seawater to an electrolytic cell, placing the three-electrode system in the simulated seawater in the electrolytic cell, and stirring the simulated seawater for electrolysis to extract uranium from the seawater, where an electrolytic cell voltage is set to −0.3 V to −0.5 V, and electrolysis is conducted for 10 min to 100 min, with power on for 1 min to 2 min and power off for 30 s to 60 s in each cycle.

Preferably, the solution of indium nitrate in isopropanol may be prepared by a method including: adding $In(NO_3)_3 \cdot 4.5H_2O$ to isopropanol, and subjecting a resulting mixture to stirring for 0.5 h to 1 h and ultrasonic treatment for 0.5 h to 1 h to obtain the solution of indium nitrate in isopropanol; and a mass ratio of the $In(NO_3)_3 \cdot 4.5H_2O$ to the glycerin may be 3:(80-120).

Preferably, in step 3, a mass-volume ratio of the spherical indium hydroxide solid to the deionized water may be 1 g:(120-160) mL.

Preferably, in step 5, a mass-volume ratio of the $In_2O_{3-x}$ sample to the ethanol may be 1 mg:(0.2-0.6) mL; and a mass-volume ratio of the $In_2O_{3-x}$ sample to the membrane solution may be 1 mg:10 μL.

Preferably, in step 5, the membrane solution may be a nafion membrane solution.

Preferably, the simulated seawater may be prepared by a method including: adding uranyl nitrate and sodium chloride to deionized water, and subjecting a resulting mixture to ultrasonic treatment for 0.5 h to 1 h to obtain the simulated seawater; and the simulated seawater may have a $U^{6+}$ concentration of 50 μg/L to 150 μg/L and a sodium chloride concentration of 0.1 mol/L to 1 mol/L.

Preferably, in step 6, after the electrolysis is completed, the three-electrode system may be placed in an electrolytic cell with a 0.1 mol/L to 1 mol/L sodium chloride solution, and the sodium chloride solution may be stirred for electrolysis, where an electrolytic cell voltage is set to +0.3 V to +0.5 V, and the electrolysis is conducted for 15 to 30 cycles, with power on for 1 min to 3 min and power off for 0.5 min to 1 min in each cycle, such that $U^{4+}$ on the working electrode is oxidized into $U^{6+}$ in the 0.1 mol/L to 1 mol/L sodium chloride solution.

Preferably, the ultrasonic treatment in steps 1, 3, and 5 may be conducted at a power of 600 W to 1,200 W and a frequency of 28 KHz to 40 KHz.

Preferably, the heating in step 2 may be conducted at a heating rate of 3° C./min to 6° C./min; the heating in step 3 may be conducted at a heating rate of 3° C./min to 6° C./min; and the heating in step 4 may be conducted at a heating rate of 8° C./min to 12° C./min.

Preferably, step 2 may be replaced by the following process: adding the mixed solution to a high-pressure reactor, introducing high-pressure carbon dioxide into the reactor, and conducting reaction under stirring for 1 h to 1.5 h at a temperature of 150° C. to 180° C. and a pressure of 18 MPa to 28 MPa; cooling to room temperature and conducting pressure release; and conducting SLS, washing a resulting solid with deionized water and ethanol, and drying the solid in a vacuum drying oven at 60° C. to 80° C. for 10 h to 14 h to obtain a spherical indium hydroxide solid.

In the present disclosure, OV-containing compounds can capture oxygen ions, and uranium in seawater exists in the form of uranyl ions, namely, uranium-oxygen complexes, such as $UO_2^{2+}$. Therefore, OVs can achieve the effect of indirect capture of uranium by capturing oxygen, such that OV-containing compounds can easily capture uranyl ions. The capture of oxygen by an OV in an OV-containing compound is equivalent to the capture of $UO_2^{2+}$, and captured $UO_2^{2+}$ is reduced into a $UO_2$ crystal by applying negative electricity and thus fixed. Once a reduced $UO_2$ crystal appears, the subsequent reduction process is similar to a crystallization process, and the crystal grows larger and larger, thus achieving the uranium extraction from seawater.

The present disclosure at least has the following beneficial effects: In the present disclosure, an OV-containing metal oxide $In_2O_{3-x}$ is prepared and mixed with a film solution, a resulting mixture is uniformly coated on carbon paper, and the carbon paper is naturally dried; dried carbon paper is clamped with a gold electrode and used as a working electrode in a three-electrode system; the three-electrode system is used to conduct electrolysis on uranium-containing simulated seawater to extract uranium; and the three-electrode system after electrolysis is placed in an electrolytic cell with a sodium chloride solution, and the voltage is reversely set for electrolysis, such that $U^{4+}$ on the working electrode can be oxidized into $U^{6+}$ in the sodium chloride solution, thereby achieving the recovery of uranium. The extraction method is simple and easy to implement.

Other advantages, objects, and features of the present disclosure will be partially embodied through the following description, and some will be understood by those skilled in the art through the research and practice for the present disclosure.

DETAILED DESCRIPTION OF THE EMBODIMENTS

The present disclosure will be further described in detail below with reference to the accompanying drawings, such that those skilled in the art can implement the present disclosure with reference to the description.

It should be understood that terms, such as "have", "include", and "comprise" as used herein, do not exclude the presence or addition of one or more other elements or a combination thereof.

Example 1

A method for electrochemical extraction of uranium from seawater using an OV-containing metal oxide was provided, including the following steps:

Step 1. 3 g of $In(NO_3)_3 \cdot 4.5H_2O$ was added to 300 mL of isopropanol, and a resulting mixture was stirred for 0.5 h and then subjected to ultrasonic treatment for 1 h to obtain a solution of indium nitrate in isopropanol; and 100 g of glycerin was added to the solution of indium nitrate in isopropanol, and a resulting mixture was stirred for 0.5 h and then subjected to ultrasonic treatment for 0.5 h to obtain a mixed solution. The ultrasonic treatment was conducted at a power of 800 W and a frequency of 35 KHz.

Step 2. The mixed solution was transferred to a high-temperature and high-pressure PTFE reactor, heated to 180° C. at a heating rate of 5° C./min and held at the temperature for 1 h, and naturally cooled to room temperature; and SLS was conducted, and a resulting solid was washed with deionized water and ethanol, and then dried in a vacuum drying oven at 60° C. for 12 h to obtain a spherical indium hydroxide solid.

Step 3. 0.2 g of the spherical indium hydroxide solid was added to 30 mL of deionized water, and a resulting mixture was subjected to ultrasonic treatment for 0.5 h; a resulting solution was transferred to a high-temperature and high-pressure PTFE reactor, heated to 50° C. at a heating rate of 5° C./min and held at the temperature for 1 h, and naturally cooled to room temperature; and a resulting solid was washed with ethanol, and then dried in an oven at 60° C. for 12 h to obtain a flaky indium hydroxide solid. The ultrasonic treatment was conducted at a power of 800 W and a frequency of 35 KHz.

Step 4. The flaky indium hydroxide solid was heated to 400° C. at a heating rate of 10° C./min in an atmosphere with a hydrogen content of less than 5%, and subjected to calcination for 2 h to obtain a calcined OV-containing $In_2O_{3-x}$ sample (X in the $In_2O_{3-x}$ represents an OV content).

Step 5. 50 mg of the $In_2O_{3-x}$ sample was added to 20 mL of ethanol, and a resulting mixture was subjected to ultrasonic treatment for 1 h; 500 μL of a nation membrane solution was added, and a resulting mixture was further subjected to ultrasonic treatment for 1 h; a resulting solution was coated uniformly on 1 cm×2 cm carbon paper, and the carbon paper was naturally dried; and dried carbon paper was clamped with a gold electrode and then used as a working electrode for a three-electrode system. In the three-electrode system, a platinum wire was used as a counter electrode and a calomel electrode was used as a reference electrode. The ultrasonic treatment was conducted at a power of 800 W and a frequency of 35 KHz.

Step 6. 166.38 μg of uranyl nitrate and 29.2 g of sodium chloride were added to 1 L of deionized water, and a resulting mixture was subjected to ultrasonic treatment at a power of 800 W and a frequency of 35 KHz to obtain simulated seawater with a $U^{6+}$ concentration of 100 μg/L and a sodium chloride concentration of 0.5 mol/L; the simulated seawater was added to an electrolytic cell, the three-electrode system was placed in the simulated seawater in the electrolytic cell, and the simulated seawater was stirred for electrolysis, where an electrolytic cell voltage was set to −4 V, and electrolysis was conducted for 10 min with power on for 1 min and power off for 30 s in each cycle to complete uranium extraction from the simulated seawater; and a $U^{6+}$ concentration in the simulated seawater obtained after the uranium extraction was determined by ICP-MS, which was 10 μg/L.

Step 7. After the electrolysis was completed, the three-electrode system was placed in an electrolytic cell with a 0.5 mol/L sodium chloride solution, and the sodium chloride solution was stirred for electrolysis, where an electrolytic cell voltage was set to +0.4 V, and the electrolysis was conducted for 20 cycles, with power on for 2 min and power off for 0.5 min in each cycle, such that $U^{4+}$ on the working electrode was oxidized into $U^{6+}$ in the 0.5 mol/L sodium chloride solution; and a $U^{6+}$ concentration in the 0.5 mol/L sodium chloride solution was determined by TCP-MS, which was 87 μg/L.

Example 2

A method for electrochemical extraction of uranium from seawater using an OV-containing metal oxide was provided, including the following steps:

Step 1. 3 g of $In(NO_3)_3 \cdot 4.5H_2O$ was added to 300 mL of isopropanol, and a resulting mixture was stirred for 1 h and then subjected to ultrasonic treatment for 0.5 h to obtain a solution of indium nitrate in isopropanol; and 100 g of glycerin was added to the solution of indium nitrate in isopropanol, and a resulting mixture was stirred for 1 h and then subjected to ultrasonic treatment for 0.5 h to obtain a mixed solution. The ultrasonic treatment was conducted at a power of 800 W and a frequency of 40 KHz.

Step 2. The mixed solution was transferred to a high-temperature and high-pressure PTFE reactor, heated to 185° C. at a heating rate of 5° C./min and held at the temperature for 2 h, and naturally cooled to room temperature; and SLS was conducted, and a resulting solid was washed with deionized water and ethanol, and then dried in a vacuum drying oven at 60° C. for 12 h to obtain a spherical indium hydroxide solid.

Step 3. 1 g of the spherical indium hydroxide solid was added to 150 mL of deionized water, and a resulting mixture was subjected to ultrasonic treatment for 1 h; a resulting solution was transferred to a high-temperature and high-pressure PTFE reactor, heated to 60° C. at a heating rate of 5° C./min and held at the temperature for 2 h, and naturally cooled to room temperature; and a resulting solid was washed with ethanol, and then dried in an oven at 60° C. for 12 h to obtain a flaky indium hydroxide solid. The ultrasonic treatment was conducted at a power of 800 W and a frequency of 40 KHz.

Step 4. The flaky indium hydroxide solid was heated to 385° C. at a heating rate of 10° C./min in an atmosphere with a hydrogen content of less than 5%, and subjected to calcination for 3 h to obtain a calcined OV-containing $In_2O_{3-x}$ sample.

Step 5. 50 mg of the $In_2O_{3-x}$ sample was added to 20 mL of ethanol, and a resulting mixture was subjected to ultrasonic treatment for 1 h; 500 μL of a nafion membrane solution was added, and a resulting mixture was further subjected to ultrasonic treatment for 1 h; a resulting solution was coated uniformly on 1 cm×2 cm carbon paper, and the carbon paper was naturally dried; and dried carbon paper was clamped with a gold electrode and then used as a working electrode for a three-electrode system. In the three-electrode system, a platinum wire was used as a counter electrode and a calomel electrode was used as a reference electrode. The ultrasonic treatment was conducted at a power of 800 W and a frequency of 40 KHz.

Step 6. 166.38 μg of uranyl nitrate and 29.2 g of sodium chloride were added to 1 L of deionized water, and a resulting mixture was subjected to ultrasonic treatment at a power of 800 W and a frequency of 35 KHz to obtain simulated seawater with a $U^{6+}$ concentration of 100 μg/L and a sodium chloride concentration of 0.5 mol/L; the simulated seawater was added to an electrolytic cell, the three-electrode system was placed in the simulated seawater in the electrolytic cell, and the simulated seawater was stirred for electrolysis, where an electrolytic cell voltage was set to −5 V, and electrolysis was conducted for 10 min with power on for 1 min and power off for 30 s in each cycle to complete uranium extraction from the simulated seawater; and a $U^{6+}$ concentration in the simulated seawater obtained after the uranium extraction was determined by ICP-MS, which was 9 μg/L. The power on, power off, and stirring operations could increase a $U^{6+}$ concentration near the working electrode and improve the extraction efficiency.

Step 7. After the electrolysis was completed, the three-electrode system was placed in an electrolytic cell with a 0.5 mol/L sodium chloride solution, and the sodium chloride solution was stirred for electrolysis, where an electrolytic cell voltage was set to +0.5 V, and the electrolysis was conducted for 20 cycles, with power on for 2 min and power off for 0.5 mm in each cycle, such that $U^{4+}$ on the working electrode was oxidized into $U^{6+}$ in the 0.5 mol/L sodium chloride solution; and a $U^{6+}$ concentration in the 0.5 mol/L sodium chloride solution was determined by ICP-MS, which was 87 µg/L.

Example 3

A method for electrochemical extraction of uranium from seawater using an OV-containing metal oxide was provided, including the following steps:

Step 1. 3 g of $In(NO_3)_3 \cdot 4.5H_2O$ was added to 300 mL of isopropanol, and a resulting mixture was stirred for 1 h and then subjected to ultrasonic treatment for 1 h to obtain a solution of indium nitrate in isopropanol; and 100 g of glycerin was added to the solution of indium nitrate in isopropanol, and a resulting mixture was stirred for 1 h and then subjected to ultrasonic treatment for 1 h to obtain a mixed solution. The ultrasonic treatment was conducted at a power of 800 W and a frequency of 40 KHz.

Step 2. The mixed solution was transferred to a high-temperature and high-pressure PTFE reactor, heated to 200° C. at a heating rate of 5° C./min and held at the temperature for 1 h, and naturally cooled to room temperature; and SLS was conducted, and a resulting solid was washed with deionized water and ethanol, and then dried in a vacuum drying oven at 60° C. for 12 h to obtain a spherical indium hydroxide solid.

Step 3. 1 g of the spherical indium hydroxide solid was added to 150 mL of deionized water, and a resulting mixture was subjected to ultrasonic treatment for 1 h; a resulting solution was transferred to a high-temperature and high-pressure PTFE reactor, heated to 60° C. at a heating rate of 5° C./min and held at the temperature for 2 h, and naturally cooled to room temperature; and a resulting solid was washed with ethanol, and then dried in an oven at 60° C. for 12 h to obtain a flaky indium hydroxide solid. The ultrasonic treatment was conducted at a power of 800 W and a frequency of 40 KHz.

Step 4. The flaky indium hydroxide solid was heated to 400° C. at a heating rate of 10° C./min in an atmosphere with a hydrogen content of less than 5%, and subjected to calcination for 2 h to obtain a calcined OV-containing $In_2O_{3-x}$ sample.

Step 5. 50 mg of the $In_2O_{3-x}$ sample was added to 20 mL of ethanol, and a resulting mixture was subjected to ultrasonic treatment for 1 h; 500 µL of a nafion membrane solution was added, and a resulting mixture was further subjected to ultrasonic treatment for 1 h; a resulting solution was coated uniformly on 1 cm×2 cm carbon paper, and the carbon paper was naturally dried; and dried carbon paper was clamped with a gold electrode and then used as a working electrode for a three-electrode system. In the three-electrode system, a platinum wire was used as a counter electrode and a calomel electrode was used as a reference electrode. The ultrasonic treatment was conducted at a power of 800 W and a frequency of 40 KHz.

Step 6. 166.38 µg of uranyl nitrate and 29.2 g of sodium chloride were added to 1 L of deionized water, and a resulting mixture was subjected to ultrasonic treatment at a power of 800 W and a frequency of 35 KHz to obtain simulated seawater with a $U^{6+}$ concentration of 100 µg/L and a sodium chloride concentration of 0.5 mol/L; the simulated seawater was added to an electrolytic cell, the three-electrode system was placed in the simulated seawater in the electrolytic cell, and the simulated seawater was stirred for electrolysis, where an electrolytic cell voltage was set to −3 V, and electrolysis was conducted for 10 min with power on for 1 min and power off for 30 s in each cycle to complete uranium extraction from the simulated seawater; and a $U^{6+}$ concentration in the simulated seawater obtained after the uranium extraction was determined by ICP-MS, which was 8 µg/L.

Step 7. After the electrolysis was completed, the three-electrode system was placed in an electrolytic cell with a 0.5 mol/L sodium chloride solution, and the sodium chloride solution was stirred for electrolysis, where an electrolytic cell voltage was set to +0.3 V, and the electrolysis was conducted for 20 cycles, with power on for 2 min and power off for 0.5 min in each cycle, such that $U^{4+}$ on the working electrode was oxidized into $U^{6+}$ in the 0.5 mol/L sodium chloride solution; and a $U^{6+}$ concentration in the 0.5 mol/L sodium chloride solution was determined by ICP-MS, which was 88 µg/L.

Example 4

A method for electrochemical extraction of uranium from seawater using an OV-containing metal oxide was provided, including the following steps:

Step 1. 3 g of $In(NO_3)_3 \cdot 4.5H_2O$ was added to 300 mL of isopropanol, and a resulting mixture was stirred for 0.5 h and then subjected to ultrasonic treatment for 1 h to obtain a solution of indium nitrate in isopropanol; and 100 g of glycerin was added to the solution of indium nitrate in isopropanol, and a resulting mixture was stirred for 0.5 h and then subjected to ultrasonic treatment for 0.5 h to obtain a mixed solution. The ultrasonic treatment was conducted at a power of 800 W and a frequency of 35 KHz.

Step 2. The mixed solution was added to a high-pressure reactor, high-pressure carbon dioxide was introduced into the reactor, and reaction was conducted under stirring for 1 h at a temperature of 180° C. and a pressure of 20 MPa; a resulting system was naturally cooled to room temperature and pressure was released; and SLS was conducted, and a resulting solid was washed with deionized water and ethanol, and then dried in a vacuum drying oven at 60° C. for 12 h to obtain a spherical indium hydroxide solid. The reaction was conducted in a supercritical carbon dioxide reaction system, such that the reaction was more uniform and an OV content in the $In_2O_{3-x}$ sample prepared subsequently was further increased.

Step 3. 0.2 g of the spherical indium hydroxide solid was added to 30 mL of deionized water, and a resulting mixture was subjected to ultrasonic treatment for 0.5 h; a resulting solution was transferred to a high-temperature and high-pressure PTFE reactor, heated to 50° C. at a heating rate of 5° C./min and held at the temperature for 1 h, and naturally cooled to room temperature; and a resulting solid was washed with ethanol, and then dried in an oven at 60° C. for 12 h to obtain a flaky indium hydroxide solid.

Step 4. The flaky indium hydroxide solid was heated to 400° C. at a heating rate of 10° C./min in an atmosphere with a hydrogen content of less than 5%, and subjected to calcination for 2 h to obtain a calcined OV-containing $In_2O_{3-x}$ sample.

Step 5. 50 mg of the $In_2O_{3-x}$ sample was added to 20 mL, of ethanol, and a resulting mixture was subjected to ultrasonic treatment for 1 h; 500 µL of a nafion membrane solution was added, and a resulting mixture was further subjected to ultrasonic treatment for 1 h; a resulting solution was coated uniformly on 1 cm×2 cm carbon paper, and the carbon paper was naturally dried; and dried carbon paper was clamped with a gold electrode and then used as a working electrode for a three-electrode system. In the three-electrode system, a platinum wire was used as a counter electrode and a calomel electrode was used as a reference electrode. The ultrasonic treatment was conducted at a power of 800 W and a frequency of 35 KHz.

Step 6. 166.38 μg of uranyl nitrate and 29.2 g of sodium chloride were added to 1 L of deionized water, and a resulting mixture was subjected to ultrasonic treatment at a power of 800 W and a frequency of 35 KHz to obtain simulated seawater with a $U^{6+}$ concentration of 100 μg/L and a sodium chloride concentration of 0.5 mol/L; the simulated seawater was added to an electrolytic cell, the three-electrode system was placed in the simulated seawater in the electrolytic cell, and the simulated seawater was stirred for electrolysis, where an electrolytic cell voltage was set to −4 V, and electrolysis was conducted for 10 min with power on for 1 min and power off for 30 s in each cycle to complete uranium extraction from the simulated seawater; and a $U^{6+}$ concentration in the simulated seawater obtained after the uranium extraction was determined by ICP-MS, which was 6 μg/L.

Step 7. After the electrolysis was completed, the three-electrode system was placed in an electrolytic cell with a 0.5 mol/L sodium chloride solution, and the sodium chloride solution was stirred for electrolysis, where an electrolytic cell voltage was set to ++0.4V, and the electrolysis was conducted for 20 cycles, with power on for 2 min and power off for 0.5 min in each cycle, such that $U^{4+}$ on the working electrode was oxidized into $U^{6+}$ in the 0.5 mol/L sodium chloride solution; and a $U^{6+}$ concentration in the 0.5 mol/L sodium chloride solution was determined by ICP-MS, which was 90 μg/L.

Figure 1:
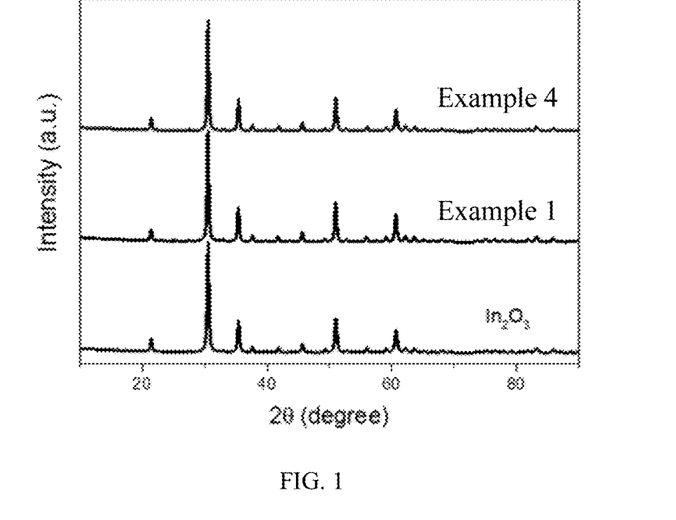
FIG. 1 shows X-ray diffraction (XRD) patterns of the OV-containing $In_2O_{3-x}$ samples prepared in Examples 1 and 4 of the present disclosure and pure $In_2O_3$.
Figure 2:
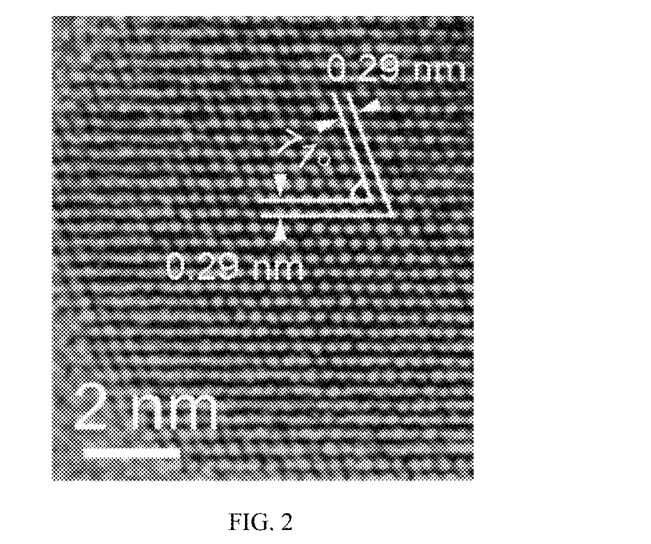
FIG. 2 shows a high resolution transmission electron microscopy (HRTEM) image of the OV-containing $In_2O_{3-x}$ sample prepared in Example 1 of the present disclosure.
Figure 3:
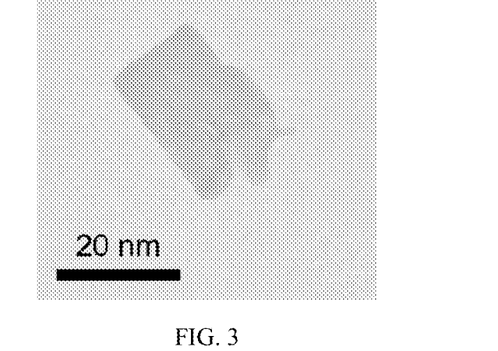
FIG. 3 shows a transmission electron microscopy (TEM) image of the OV-containing $In_2O_{3-x}$ sample prepared in Example 1 of the present disclosure.
Figure 4:
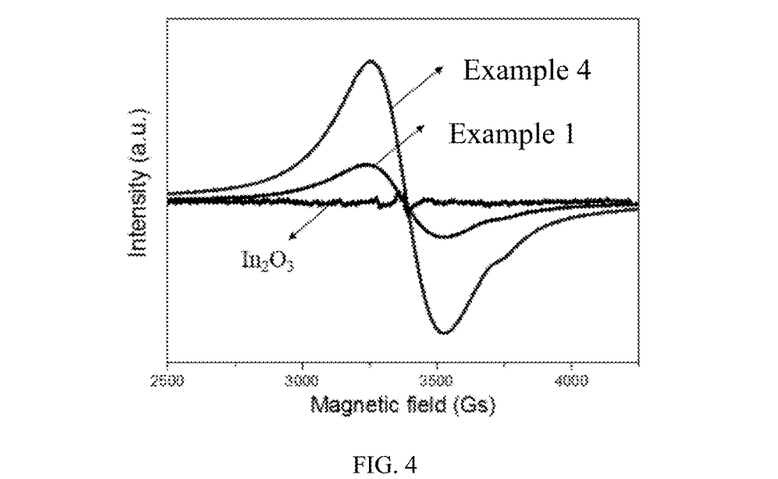
FIG. 4 shows electron-spin resonance (ESR) spectra of the OV-containing $In_2O_{3-x}$ samples prepared in Examples 1 and 4 of the present disclosure and pure $In_2O_3$.
Figure 5:
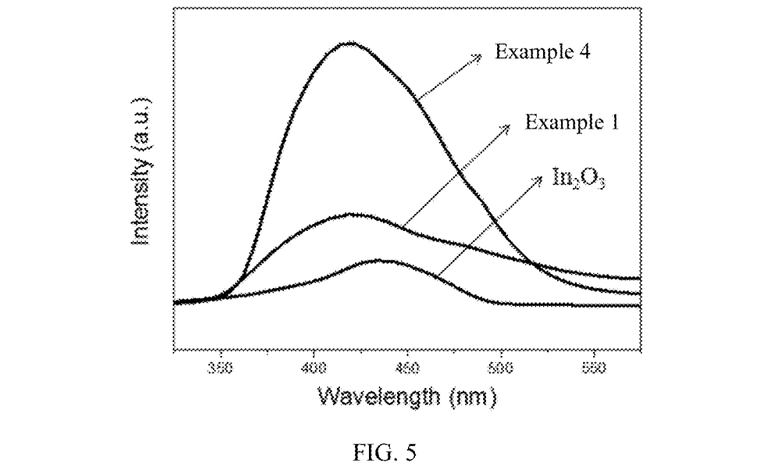
FIG. 5 shows photoluminescence (PL) spectra of the OV-containing $In_2O_{3-x}$ samples prepared in Examples 1 and 4 of the present disclosure and pure $In_2O_3$.
Figure 6:
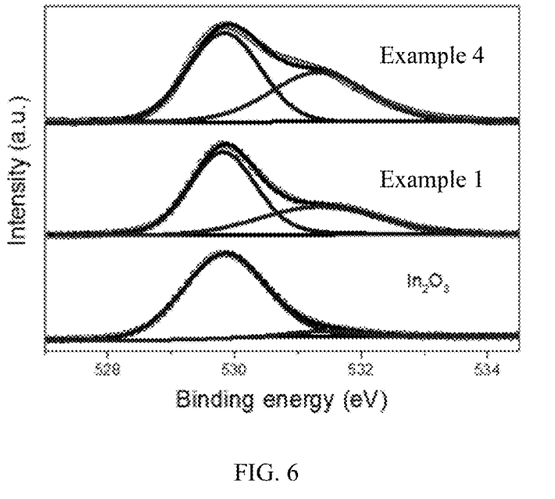
FIG. 6 shows X-ray photoelectron spectroscopy (XPS) spectra (O 1s) of the OV-containing $In_2O_{3-x}$ samples prepared in Examples 1 and 4 of the present disclosure and pure $In_2O_{3-x}$.

It can be seen from FIG. 1 that the OV-containing $In_2O_{3-x}$ samples prepared in Examples 1 and 4 have a crystal phase consistent with that of pure $In_2O_3$, which is a cubic crystal phase. FIG. 2 shows an HRTEM image of the OV-containing $In_2O_{3-x}$ sample prepared in Example 1, which can also indicate that the sample has a cubic crystal phase. FIG. 3 shows a TEM image of the OV-containing $In_2O_{3-x}$ sample prepared in Example 1, and it can be seen that the $In_2O_{3-x}$ sample has a flaky appearance. FIG. 4 shows ESR spectra of the OV-containing $In_2O_{3-x}$ samples prepared in Examples 1 and 4 and pure $In_2O_3$, where a signal appearing at about 3,400 Gs indicates the capture of electrons by OVs, and the stronger the signal, the higher the OV content in the prepared $In_2O_{3-x}$ sample. FIG. 5 shows PL spectra of the OV-containing $In_2O_{3-x}$ samples prepared in Examples 1 and 4 and pure $In_2O_3$, where a PL emission peak at 435 nm mainly indicates the occupation of OVs caused by the capture of electrons by photo-generated holes, and the stronger the signal, the higher the OV content in the prepared $In_2O_{3-x}$ sample. FIG. 6 shows XPS spectra (O 1s) of the OV-containing $In_2O_{3-x}$ samples prepared in Examples 1 and 4 and pure $In_2O_3$, where two peaks can also be clearly identified in the O 1s core layer spectrum; the one at 529.8 eV indicates In—O—In bonds; and the other one at 531.4 eV indicates oxygen atoms near OVs, and the larger the peak area, the more oxygen atoms near OVs, indicating more OVs.

Example 5

A method for electrochemical extraction of uranium from seawater using an OV-containing metal oxide was provided, including the following steps:

Step 1. 3 g of $In(NO_3)_3 \cdot 4.5H_2O$ was added to 300 mL of isopropanol, and a resulting mixture was stirred for 1 h and then subjected to ultrasonic treatment for 0.5 h to obtain a solution of indium nitrate in isopropanol; and 100 g of glycerin was added to the solution of indium nitrate in isopropanol, and a resulting mixture was stirred for 1 h and then subjected to ultrasonic treatment for 0.5 h to obtain a mixed solution. The ultrasonic treatment was conducted at a power of 800 W and a frequency of 40 KHz.

Step 2. The mixed solution was added to a high-pressure reactor, high-pressure carbon dioxide was introduced into the reactor, and reaction was conducted under stirring for 2 h at a temperature of 185° C. and a pressure of 22 MPa; a resulting system was naturally cooled to room temperature and pressure was released; and SLS was conducted, and a resulting solid was washed with deionized water and ethanol, and then dried in a vacuum drying oven at 60° C. for 12 h to obtain a spherical indium hydroxide solid.

Step 3. 1 g of the spherical indium hydroxide solid was added to 150 mL of deionized water, and a resulting mixture was subjected to ultrasonic treatment for 1 h; a resulting solution was transferred to a high-temperature and high-pressure PTFE reactor, heated to 60° C. at a heating rate of 5° C./min and held at the temperature for 2 h, and naturally cooled to room temperature; and a resulting solid was washed with ethanol, and then dried in an oven at 60° C. for 12 h to obtain a flaky indium hydroxide solid.

Step 4. The flaky indium hydroxide solid was heated to 385° C. at a heating rate of 10° C./min in an atmosphere with a hydrogen content of less than 5%, and subjected to calcination for 3 h to obtain a calcined OV-containing $In_2O_{3-x}$ sample.

Step 5. 50 mg of the $In_2O_{3-x}$ sample was added to 20 mL of ethanol, and a resulting mixture was subjected to ultrasonic treatment for 1 h; 500 μL of a nation membrane solution was added, and a resulting mixture was further subjected to ultrasonic treatment for 1 h; a resulting solution was coated uniformly on 1 cm×2 cm carbon paper, and the carbon paper was naturally dried; and dried carbon paper was clamped with a gold electrode and then used as a working electrode for a three-electrode system. In the three-electrode system, a platinum wire was used as a counter electrode and a calomel electrode was used as a reference electrode. The ultrasonic treatment was conducted at a power of 800 W and a frequency of 40 KHz.

Step 6. 166.38 μg of uranyl nitrate and 29.2 g of sodium chloride were added to 1 L of deionized water, and a resulting mixture was subjected to ultrasonic treatment at a power of 800 W and a frequency of 35 KHz to obtain simulated seawater with a $U^{6+}$ concentration of 100 μg/L and a sodium chloride concentration of 0.5 mol/L; the simulated seawater was added to an electrolytic cell, the three-electrode system was placed in the simulated seawater in the electrolytic cell, and the simulated seawater was stirred for electrolysis, where an electrolytic cell voltage was set to −5 V, and electrolysis was conducted for 10 min with power on for 1 min and power off for 30 s in each cycle to complete uranium extraction from the simulated seawater; and a $U^{6+}$ concentration in the simulated seawater obtained after the uranium extraction was determined by ICP-MS, which was 5 μg/L.

Step 7. After the electrolysis was completed, the three-electrode system was placed in an electrolytic cell with a 0.5 mol/L sodium chloride solution, and the sodium chloride solution was stirred for electrolysis, where an electrolytic cell voltage was set to +0.5 V, and the electrolysis was conducted for 20 cycles, with power on for 2 min and power off for 0.5 min in each cycle, such that $U^{4+}$ on the working electrode was oxidized into $U^{6+}$ in the 0.5 mol/L sodium chloride solution; and a $U^{6+}$ concentration in the 0.5 mol/L sodium chloride solution was determined by ICP-MS, which was 91 μg/L.

Example 6

A method for electrochemical extraction of uranium from seawater using an OV-containing metal oxide was provided, including the following steps:

Step 1. 3 g of $In(NO_3)_3 \cdot 5H_2O$ was added to 300 mL of isopropanol, and a resulting mixture was stirred for 1 h and then subjected to ultrasonic treatment for 1 h to obtain a solution of indium nitrate in isopropanol; and 100 g of glycerin was added to the solution of indium nitrate in isopropanol, and a resulting mixture was stirred for 1 h and then subjected to ultrasonic treatment for 1 h to obtain a mixed solution. The ultrasonic treatment was conducted at a power of 800 W and a frequency of 40 KHz.

Step 2. The mixed solution was added to a high-pressure reactor, high-pressure carbon dioxide was introduced into the reactor, and reaction was conducted under stirring for 2 h at a temperature of 200° C. and a pressure of 25 MPa; a resulting system was naturally cooled to room temperature and pressure was released; and SLS was conducted, and a resulting solid was washed with deionized water and ethanol, and then dried in a vacuum drying oven at 60° C. for 12 h to obtain a spherical indium hydroxide solid.

Step 3. 1 g of the spherical indium hydroxide solid was added to 150 mL of deionized water, and a resulting mixture was subjected to ultrasonic treatment for 1 h; a resulting solution was transferred to a high-temperature and high-pressure PTFE reactor, heated to 60° C. at a heating rate of 5° C./min and held at the temperature for 2 h, and naturally cooled to room temperature; and a resulting solid was washed with ethanol, and then dried in an oven at 60° C. for 12 h to obtain a flaky indium hydroxide solid.

Step 4. The flaky indium hydroxide solid was heated to 400° C. at a heating rate of 10° C./min in an atmosphere with a hydrogen content of less than 5%, and subjected to calcination for 2 h to obtain a calcined OV-containing $In_2O_{3-x}$ sample.

Step 5. 50 mg of the $In_2O_{3-x}$ sample was added to 20 mL of ethanol, and a resulting mixture was subjected to ultrasonic treatment for 1 h; 500 μL of a nafion membrane solution was added, and a resulting mixture was further subjected to ultrasonic treatment for 1 h; a resulting solution was coated uniformly on 1 cm×2 cm carbon paper, and the carbon paper was naturally dried; and dried carbon paper was clamped with a gold electrode and then used as a working electrode for a three-electrode system. In the three-electrode system, a platinum wire was used as a counter electrode and a calomel electrode was used as a reference electrode. The ultrasonic treatment was conducted at a power of 800 W and a frequency of 40 KHz.

Step 6. 166.38 μg of uranyl nitrate and 29.2 g of sodium chloride were added to 1 L of deionized water, and a resulting mixture was subjected to ultrasonic treatment at a power of 800 W and a frequency of 35 KHz to obtain simulated seawater with $U^{6+}$ concentration of 100 μg/L and a sodium chloride concentration of 0.5 mol/L; the simulated seawater was added to an electrolytic cell, the three-electrode system was placed in the simulated seawater in the electrolytic cell, and the simulated seawater was stirred for electrolysis, where an electrolytic cell voltage was set to −3 V, and electrolysis was conducted for 10 min with power on for 1 min and power off for 30 s in each cycle to complete uranium extraction from the simulated seawater; and a $U^{6+}$ concentration in the simulated seawater obtained after the uranium extraction was determined by ICP-MS, which was 5 μg/L.

Step 7. After the electrolysis was completed, the three-electrode system was placed in an electrolytic cell with a 0.5 mol/L sodium chloride solution, and the sodium chloride solution was stirred for electrolysis, where an electrolytic cell voltage was set to +0.3 V, and the electrolysis was conducted for 20 cycles, with power on for 2 min and power off for 0.5 min in each cycle, such that $U^{4+}$ on the working electrode was oxidized into $U^{6+}$ in the 0.5 mol/L sodium chloride solution; and a $U^{6+}$ concentration in the 0.5 mol/L sodium chloride solution was determined by ICP-MS, which was 92 μg/L.

The examples of the present disclosure have been disclosed above, which are not limited to the applications listed in the specification and implementations and can be absolutely applied to various fields suitable for the present disclosure. Additional modifications can be easily made by those skilled in the art. Therefore, without departing from the general concepts defined by the claims and equivalent scopes thereof, the present disclosure is not limited to specific details and the legends shown and described herein.

What is claimed is:

1. A method for an electrochemical extraction of uranium from seawater using an oxygen vacancy (OV)-containing metal oxide, comprising the following steps:

step 1, preparing a solution of indium nitrate at a concentration of 0.024 mol/L to 0.028 mol/L in isopropanol, adding glycerin to the solution of indium nitrate in isopropanol to obtain a first mixture, and subjecting the first mixture to stirring for 0.5 h to 1 h and then to ultrasonic treatment for 0.5 h to 1 h to obtain a mixed solution;

step 2, transferring the mixed solution to a high-temperature and high-pressure polytetrafluoroethylene (PTFE) reactor, heating the mixed solution to a first temperature of 160° C. to 200° C. and holding at the first temperature for 1 h to 3 h, and naturally cooling to room temperature; and conducting solid-liquid separation (SLS), washing a resulting solid with deionized water and ethanol to obtain a washed solid, and drying the washed solid in a vacuum drying oven at 60° C. to 80° C. for 10 h to 14 h to obtain a spherical indium hydroxide solid;

step 3, dissolving the spherical indium hydroxide solid in deionized water, and conducting ultrasonic treatment for 0.5 h to 1 h to obtain a first treated solution; transferring the first treated solution to the high-temperature and high-pressure PTFE reactor, heating the first treated solution to a second temperature of 40° C. to 60° C. and holding at the second temperature for 1 h to 3 h, and naturally cooling to room temperature; and washing with ethanol, and drying in an oven at 60° C. to 80° C. for 10 h to 14 h to obtain a flaky indium hydroxide solid;

step 4, heating the flaky indium hydroxide solid to 350° C. to 450° C. in an atmosphere with a hydrogen content of less than 5%, and conducting calcination for 1 h to 3 h to obtain a calcined OV-containing $In_2O_{3-x}$ sample;

step 5, adding the $In_2O_{3-x}$ sample to ethanol, and conducting ultrasonic treatment for 0.5 h to 1 h; adding a membrane solution, and further conducting ultrasonic treatment for 0.5 h to 1 h to obtain a second treated solution; coating the second treated solution uniformly on carbon paper, and naturally drying the carbon paper; and clamping dried carbon paper with a gold electrode, and using a resulting product as a working electrode for a three-electrode system, wherein in the three-electrode system, a platinum wire is used as a counter electrode and a calomel electrode is used as a reference electrode; and step 6, adding simulated seawater to an electrolytic cell, placing the three-electrode system in the simulated seawater in the electrolytic cell, and stirring the simulated seawater for a first electrolysis to extract uranium from the simulated seawater, wherein an electrolytic cell voltage is set to −0.3 V to −0.5 V, and the first electrolysis is conducted for 10 min to 100 min, with power on for 1 min to 2 min and power off for 30 s to 60 s in each cycle.

2. The method for the electrochemical extraction of uranium from seawater using the OV-containing metal oxide according to claim 1, wherein the solution of indium nitrate in isopropanol is prepared by a method comprising: adding $In(NO_3)_3 \cdot 4.5H_2O$ to isopropanol to obtain a second mixture, and subjecting the second mixture to stirring for 0.5 h to 1 h and ultrasonic treatment for 0.5 h to 1 h to obtain the solution of indium nitrate in isopropanol; and a mass ratio of the $In(NO_3)_3 \cdot 4.5H_2O$ to the glycerin is 3:(80-120).

3. The method for the electrochemical extraction of uranium from seawater using the OV-containing metal oxide according to claim 1, wherein in step 3, a mass-volume ratio of the spherical indium hydroxide solid to the deionized water is 1 g:(120-160) mL.

4. The method for the electrochemical extraction of uranium from seawater using the OV-containing metal oxide according to claim 1, wherein in step 5, a mass-volume ratio of the $In_2O_{3-x}$ sample to the ethanol is 1 mg:(0.2-0.6) mL; and a mass-volume ratio of the $In_2O_{3-x}$ sample to the membrane solution is 1 mg:10 μL.

5. The method for the electrochemical extraction of uranium from seawater using the OV-containing metal oxide according to claim 1, wherein in step 5, the membrane solution is a nafion membrane solution.

6. The method for the electrochemical extraction of uranium from seawater using the OV-containing metal oxide according to claim 1, wherein the simulated seawater is prepared by a method comprising: adding uranyl nitrate and sodium chloride to deionized water to obtain a second mixture, and subjecting the second mixture to ultrasonic treatment for 0.5 h to 1 h to obtain the simulated seawater; and the simulated seawater has a $U^{6+}$ concentration of 50 μg/L to 150 μg/L and a sodium chloride concentration of 0.1 mol/L to 1 mol/L.

7. The method for the electrochemical extraction of uranium from seawater using the OV-containing metal oxide according to claim 1, wherein in step 6, after the first electrolysis is completed, the three-electrode system is placed in the electrolytic cell or a different electrolytic cell with a 0.1 mol/L to 1 mol/L sodium chloride solution, and the sodium chloride solution is stirred for a second electrolysis, wherein an electrolytic cell voltage is set to +0.3 V to +0.5 V, and the second electrolysis is conducted for 15 to 30 cycles, with power on for 1 min to 3 min and power off for 0.5 min to 1 min in each cycle, such that $U^{4+}$ on the working electrode is oxidized into $U^{6+}$ in the 0.1 mol/L to 1 mol/L sodium chloride solution.

8. The method for the electrochemical extraction of uranium from seawater using the OV-containing metal oxide according to claim 1, wherein the ultrasonic treatment in steps 1, 3, and 5 is conducted at a power of 600 W to 1,200 W and a frequency of 28 KHz to 40 KHz.

9. The method for the electrochemical extraction of uranium from seawater using the OV-containing metal oxide according to claim 1, wherein the heating in step 2 is conducted at a heating rate of 3° C./min to 6° C./min; the heating in step 3 is conducted at a heating rate of 3° C./min to 6° C./min; and the heating in step 4 is conducted at a heating rate of 8° C./min to 12° C./min.

10. The method for the electrochemical extraction of uranium from seawater using an OV-containing metal oxide comprising the following steps:

step 1, preparing a solution of indium nitrate at a concentration of 0.024 mol/L to 0.028 mol/L in isopropanol, adding glycerin to the solution of indium nitrate in isopropanol to obtain a first mixture, and subjecting the first mixture to stirring for 0.5 h to 1 h and then to ultrasonic treatment for 0.5 h to 1 h to obtain a mixed solution;

step 2, adding the mixed solution to a high-pressure reactor, introducing high-pressure carbon dioxide into the high-pressure reactor, and conducting a reaction under stirring for 1 h to 1.5 h at a third temperature of 150° C. to 180° C. and a pressure of 18 MPa to 28 MPa; naturally cooling to room temperature and conducting pressure release; and conducting solid-liquid separation (SLS), washing a resulting solid with deionized water and ethanol to obtain a washed solid, and drying the washed solid in a vacuum drying oven at 60° C. to 80° C. for 10 h to 14 h to obtain a spherical indium hydroxide solid;

step 3, dissolving the spherical indium hydroxide solid in deionized water, and conducting ultrasonic treatment for 0.5 h to 1 h to obtain a first treated solution; transferring the first treated solution to the high-pressure reactor, heating the first treated solution to a second temperature of 40° C. to 60° C. and holding at the second temperature for 1 h to 3 h, and naturally cooling to room temperature; and washing with ethanol, and drying in an oven at 60° C. to 80° C. for 10 h to 14 h to obtain a flaky indium hydroxide solid;

step 4, heating the flaky indium hydroxide solid to 350° C. to 450° C. in an atmosphere with a hydrogen content of less than 5%, and conducting calcination for 1 h to 3 h to obtain a calcined OV-containing $In_2O_{3-x}$ sample;

step 5, adding the $In_2O_{3-x}$ sample to ethanol, and conducting ultrasonic treatment for 0.5 h to 1 h; adding a membrane solution, and further conducting ultrasonic treatment for 0.5 h to 1 h to obtain a second treated solution; coating the second treated solution uniformly on carbon paper, and naturally drying the carbon paper; and clamping dried carbon paper with a gold electrode, and using a resulting product as a working electrode for a three-electrode system, wherein in the three-electrode system, a platinum wire is used as a counter electrode and a calomel electrode is used as a reference electrode; and step 6, adding simulated seawater to an electrolytic cell, placing the three-electrode system in the simulated seawater in the electrolytic cell, and stirring the simulated seawater for a first electrolysis to extract uranium from the simulated seawater, wherein an electrolytic cell voltage is set to −0.3 V to −0.5 V, and the first electrolysis is conducted for 10 min to 100 min, with power on for 1 min to 2 min and power off for 30 s to 60 s in each cycle.

11. The method for the electrochemical extraction of uranium from seawater using the OV-containing metal oxide according to claim 10, wherein the solution of indium nitrate in isopropanol is prepared by a method comprising: adding $In(NO_3)_3 \cdot 4.5H_2O$ to isopropanol to obtain a second mixture, and subjecting the second mixture to stirring for 0.5 h to 1 h and ultrasonic treatment for 0.5 h to 1 h to obtain the solution of indium nitrate in isopropanol; and a mass ratio of the $In(NO_3)_3 \cdot 4.5H_2O$ to the glycerin is 3:(80-120).

12. The method for the electrochemical extraction of uranium from seawater using the OV-containing metal oxide according to claim 10, wherein in step 3, a mass-volume ratio of the spherical indium hydroxide solid to the deionized water is 1 g:(120-160) mL.

13. The method for the electrochemical extraction of uranium from seawater using the OV-containing metal oxide according to claim 10, wherein in step 5, a mass-volume ratio of the $In_2O_{3-x}$ sample to the ethanol is 1 mg:(0.2-0.6) mL; and a mass-volume ratio of the $In_2O_{3-x}$ sample to the membrane solution is 1 mg:10 µL.

14. The method for the electrochemical extraction of uranium from seawater using the OV-containing metal oxide according to claim 10, wherein in step 5, the membrane solution is a nafion membrane solution.

15. The method for the electrochemical extraction of uranium from seawater using the OV-containing metal oxide according to claim 10, wherein the simulated seawater is prepared by a method comprising: adding uranyl nitrate and sodium chloride to deionized water to obtain a second mixture, and subjecting the second mixture to ultrasonic treatment for 0.5 h to 1 h to obtain the simulated seawater; and the simulated seawater has a $U^{6+}$ concentration of 50 µg/L to 150 µg/L and a sodium chloride concentration of 0.1 mol/L to 1 mol/L.

16. The method for the electrochemical extraction of uranium from seawater using the OV-containing metal oxide according to claim 10, wherein in step 6, after the first electrolysis is completed, the three-electrode system is placed in the electrolytic cell or a different electrolytic cell with a 0.1 mol/L to 1 mol/L sodium chloride solution, and the sodium chloride solution is stirred for a second electrolysis, wherein an electrolytic cell voltage is set to +0.3 V to +0.5 V, and the second electrolysis is conducted for 15 to 30 cycles, with power on for 1 min to 3 min and power off for 0.5 min to 1 min in each cycle, such that $U^{4+}$ on the working electrode is oxidized into $U^{6+}$ in the 0.1 mol/L to 1 mol/L sodium chloride solution.

17. The method for the electrochemical extraction of uranium from seawater using the OV-containing metal oxide according to claim 10, wherein the ultrasonic treatment in steps 1, 3, and 5 is conducted at a power of 600 W to 1,200 W and a frequency of 28 KHz to 40 KHz.

18. The method for the electrochemical extraction of uranium from seawater using the OV-containing metal oxide according to claim 10, wherein the heating in step 2 is conducted at a heating rate of 3° C./min to 6° C./min; the heating in step 3 is conducted at a heating rate of 3° C./min to 6° C./min; and the heating in step 4 is conducted at a heating rate of 8° C./min to 12° C./min.

\* \* \* \* \*